United States Patent [19]

Shum et al.

[11] 4,000,448
[45] Dec. 28, 1976

[54] CONTROL SYSTEM FOR SENSING THE AIR GAP BETWEEN A CUTTING TOOL AND A WORK PIECE

[75] Inventors: Lanson Yatsang Shum, Delmont; Robert C. Miller, Pittsburgh, both of Pa.

[73] Assignee: Westinghouse Electric Corporation, Pittsburgh, Pa.

[22] Filed: May 10, 1974

[21] Appl. No.: 468,706

[52] U.S. Cl. .............................. 318/39; 318/572; 318/653; 318/656; 324/34 D; 340/199; 219/69 G

[51] Int. Cl.² .......................................... B23Q 5/10

[58] Field of Search ............ 318/39, 572, 653, 561, 318/656, 657; 336/134; 324/34 D, 34 PS; 340/195, 199; 219/69 G; 286/125 R

[56] References Cited

UNITED STATES PATENTS

| 2,627,119 | 2/1953 | Graham | 336/134 UX |
|---|---|---|---|
| 3,206,663 | 9/1965 | Neal et al. | 318/571 X |
| 3,286,160 | 11/1966 | Isoda et al. | 318/656 X |
| 3,447,419 | 6/1969 | Foster | 318/572 X |
| 3,594,671 | 7/1971 | Frenkel | 336/134 X |
| 3,641,849 | 2/1972 | Kinney | 318/572 X |
| 3,684,961 | 8/1972 | Muir | 324/34 D |

*Primary Examiner*—Robert K. Schaefer
*Assistant Examiner*—John J. Feldhaus
*Attorney, Agent, or Firm*—James J. Wood

[57] ABSTRACT

A system for sensing the air gap between a cutting tool and a work piece mounted on a machine for the purpose of controlling the traverse feed rate of the machine as contiguity approaches. A drive coil is mounted on the machine. A search coil surrounds the cutting tool in proximity to the air gap and is mutually coupled ($M_1$) to the drive coil. A mutual inductor has first and second coils arranged so that their mutual inductance $M_2$ is variable; these coils are connected in common at one end to a variable inductionless resistor $r$. The first coil is connected series aiding with the drive coil, while the second coil is connected in series opposition with the search coil. An a.c. source is connected across the drive coil, first coil and inductionless resistor. The induced voltage across the series combination of search coil, second coil, and inductionless resistor provides an output which is initially nulled by adjusting $M_2$ and $r$ for a selected datum displacement between cutting tool and work piece. The change in induced output voltage $\Delta e$ varies in accordance with the mutual inductive $M_1$ which changes as a function of the instantaneous displacement between the cutting tool and the work piece. The induced voltage $\Delta e$ is then used to provide an adaptive voltage which serves to vary the traverse feed rate of the machine as required.

8 Claims, 4 Drawing Figures

CONTROL SYSTEM FOR SENSING THE AIR GAP BETWEEN A CUTTING TOOL AND A WORK PIECE

BACKGROUND OF THE INVENTION

1. Field of the Invention

The present invention relates to a system for sensing the air gap between a cutting tool and a work piece mounted on a machine for the purpose of controlling the traverse feed rate of the machine as contiguity approaches.

2. Description of the Prior Art

The adaptive control technique for numerically controlled machine tools contemplates the maintenance of an optimum spindle power, and accordingly the feed rate, and sometimes speed, are varied up and down to compensate for such parameters as: variations in width and depth of cut, hardness of materials etc.

The programmed tape for conventional numerically controlled machine tools, in addition to positioned information, includes feed rates and speeds which are fixed over one or more blocks of intelligence. Usually the programmer is cautious and programs a conservative feed rate so that the machine is not working to full capacity. The adaptive control technique proposes to modify the feed rate (and sometimes the speed) to increase productivity at no sacrifice to the life of the components. For example adaptive control insures that the horse power limitations of the feed motors will not be exceeded and that the cutting tool will not be damaged by exceeding the breakage feed limit.

In machining operations the cutting tool is moving through air for a considerable portion of time. Instead of the relatively slow traverse feed provided by the punched tape, it is better to move through air at rapid traverse feed and then reduce the feed upon impact of cutting tool and work. In order to provide this reduction in feed rate, the prior art teaches the use of torque transducers which sense the increased torque requirements when the cutting tool comes in contact with the work piece. Various forms of torque transducers have been developed so that the machine table feed rate can be controlled to a programmed spindle torque. When the cutting tool is in air, the feed rate is increased to a maximum or say three times the feed rate. When the cutting tool makes contact with the work, the torque transducer senses the increased cutting requirements, and the adaptive control loop drops the feed rate to a magnitude equal to the programmed torque.

Optimally when the cutter is in air, the feed rate should be at rapid traverse speed in the order of 200 inches/min instead to typically 15 inches/min. A milling machine servo is capable of decelerating from rapid traverse speed to a halt in 0.2 sec. Thus if the torque transducer senses a torque which exceeds the programmed torque, a stop signal is sent to the control section to stop the machine table. In such a situation as has been supposed, the cutter would overshoot by 0.33 inch in 0.2 sec.

$$\frac{\frac{200''}{min.} \times \frac{.2\ min.}{60}}{2} = 0.33\ inch$$

Obviously this would spoil the workpiece and possibly chip or even break the cutting tool.

The present invention proposes to cut down on pre-positioning time by moving at rapid traverse feed through air and continuously sensing the air gap between cutting tool and work piece as contiguity approaches, so that at some pre-set point the feed is reduced to an allowable impact feed rate, allowing the power adaptive control loop to take over.

SUMMARY OF THE INVENTION

A control system for sensing the air gap between a cutting tool and a work piece mounted on a machine tool comprising, driving circuitry including drive coil means having an inductance $L_1$ mounted on said machine tool, said driving circuitry being adopted to receive an a.c. source. Search circuitry, including search coil means, having an inductance $L_2$ surrounds the cutting tool in proximity to the air gap and is mutually coupled $M_1$ to the drive coil means. Means are provided for detecting the change in mutual inductance $\Delta M_1$ as a function of the instantaneous air gap displacement between the cutting tool and the work piece in accordance with $$\Delta M_1 = \Delta k \sqrt{L_1 L_2}$$

where $\Delta M_1$ = the instantaneous change in mutual inductance between the drive coil means and the search coil means;

$\Delta k$ = the instantaneous change in coefficient of coupling;

$L_1$ = the inductance of the drive coil means $L_2$ = the inductance of the search coil means The change in mutual inductance $\Delta M_1$ appears as a change in induced voltage, from which an adaptive voltage is derived to control the traverse feed rate of the machine tool as a function of the air gap displacement between the cutting tool and the work piece.

DESCRIPTION OF THE PREFERRED EMBODIMENT

Figure 1:
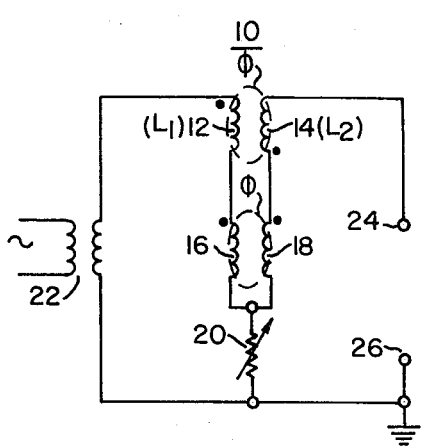
FIG. 1 is an electrical schematic of the air gap signal sensing means in accordance with the invention.
Figure 2:
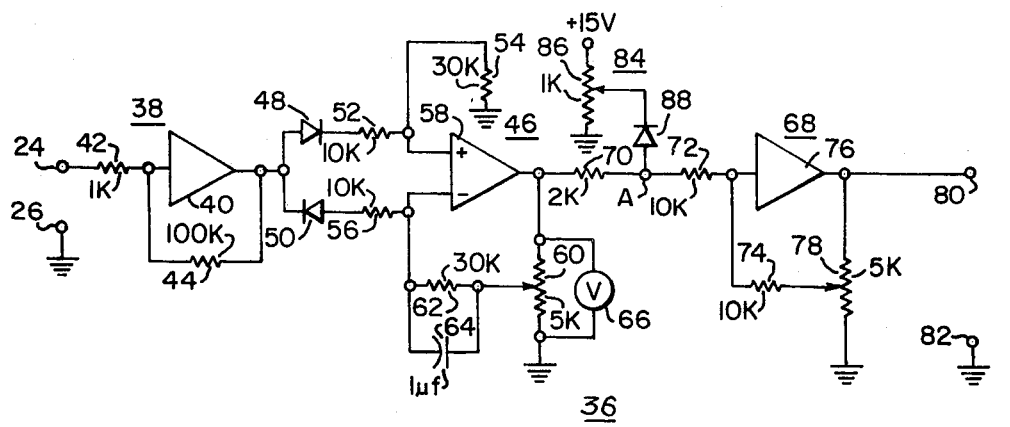
FIG. 2 is an electrical schematic of the signal processing circuitry for developing the adaptive control voltage.

The complete tool work piece air gap sensing control system is shown schematically in FIG. 1 and FIG. 2.

Referring first to FIG. 1 which depicts the signal sensing means indicated generally at 10, an active or driving coil 12 having an inductance $L_1$ is arranged in proximity to a search coil 14 having an inductance $L_2$ so that there is mutual coupling $M_1$ therebetween. A mutual inductor having coils 16, 18 is located remote from the coil pair 12, 14 the coils 12, 16; 14, 18 being serially connected at respective end points as shown. A variable inductionless resistor 20 is connected to the other end points of coils 16, 18 as indicated. The signal sensing means 10 is energized by a 6.3v 60Hz source provided by means of a step down transformer 22. The output of the signal sensing means 10 is an a.c. voltage developed at terminals 24, 26.

Figure 3:
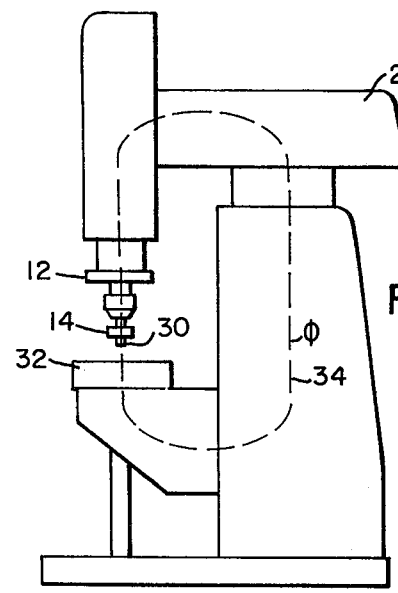
FIG. 3 depicts the drive coil and search coil mounted on a milling machine in accordance with the invention; and, FIG. 4 is a diagram showing feed rate override vs. air gap and adaptive control voltage vs. air gap, used in explaining the operation of the invention.

As shown in FIG. 3, in one application, the signal sensing means 10 is mounted on a milling machine 28, for the purpose of sensing the air gap between a cutting tool 30 and a work piece 32. As indicated by the broken line 34 the path of the flux $\phi$ may be traced: through the support casting of the milling machine through the work piece 32 through the air gap, through the cutting tool 30 and return through the cutting tool support members. With the exception of the air gap this is essentially a path composed of ferruous material.

The signal derived from the signal sensing means 10 is applied to the signal processing circuit indicated generally at 36. The terminals 24, 26 are first connected to an operational amplifier indicated generally at 38, which serves as a scale changer or amplifier. The operational amplifier 38 includes an amplifier identified, symbolically at 40, input resistor 42 and feedback resistor 44. The output of the amplifier 38 is applied to a full wave rectifier-filter variable gain circuit indicated generally at 46, and comprising diodes 48, 50 input resistors 52, 54, 56, an amplifier indicated symbolically at 58, output potentiometer 60 and R-C feedback 62, 64. A voltmeter 66 is connected across the full range of potentiometer 60.

The output of the rectifier filter variable gain circuit 46 is applied to an inverting amplifier indicated generally at 68 through a resistor 70. The inverting amplifier symbolically indicated at 68 comprises input resistor 72, feedback resistor 74, an amplifier indicated symbolically at 76 and a potentiometer 78 in the output which is developed across terminals 80, 82. A limiting circuit indicated generally at 84, comprises a potentiometer 86 connected between positive battery (+15 v) and ground the sliding contact thereof being connected to the cathode of a diode 88, the anode being connected to the junction between resistors 70 and 72.

OPERATION OF THE SYSTEM

As may be seen from a study of FIG. 3, the flux path is composed mainly of low reluctance ferrous materials in series with the high reluctance air gap path between the cutter 30 and the work piece 32.

The mutual inductance $M_1$ between the coils 12 and 14 is $M_1 = k \sqrt{L_1 L_2}$ where:

$k$ = the coefficient of coupling between coils 12 and 14
$L_1$ = the inductance of coil 12 and
$L_2$ = the inductance of coil 14

Similarly there is a mutual coupling $M_2$ between coils 16 and 18 which is a function of the relative displacement of the coils 16 and 18, which displacement is adjustable by means of a non-magnetic screw (not shown). The resistance $r$ of resistor 20 is also variable.

The dot notation at the ends of the respective coils 12, 14, 16, 18 signifies the same instantaneous polarity. Thus the voltages developed across coils 12, 14 are additive, while the voltages developed across coils 16 and 18 ae bucking.

With the cutter 30 at some datum displacement vis-à-vis the work piece 32, the signal sensing means is nulled i.e. a zero voltage is produced across 24, 26. The datum displacement may be at some remote point away say 1.75 inches or it could be some intermediate point say 0.50 or 0.75 inches.

The sensing means is nulled by adjusting $M_2$ and $r$ until zero voltage appears. (If perfect transformer coupling existed between the coils variable resistor 20 would not be necessary. However in a practical transformer there are iron losses etc. so that out of phase currents must be brought into phase—this is accomplished by adjusting resistor 20.)

As the work piece 32 and the cutting tool 30 approach contiguity, the mutual coupling between coils 12 and 14 changes incrementally:

$$\Delta M_1 = \Delta k \sqrt{L_1 L_2}$$

where $\Delta M_1$ = the instantaneous change in mutual inductance
$\Delta k$ = the instantaneous change in coupling
$L_1$ = the inductance of coil 12
$L_2$ = the inductance of coil 14

The induced voltage $e$ across search coil 14 is a function of the mutual inductance $M_1$, that is as $\Delta M_1$ increases the induced voltage $e$ increases. This induced voltage $e$ is applied to the signal processing circuitry of FIG. 2.

In the practical embodiment here illustrated the maximum signal at terminals 24, 26 is in the order of .050 volts. Assume that 50 millivolts exists at 24, 26. The amplifier 38 amplifies the signal by 100 so that 5 volts are applied to the rectifier filter variable gain circuit 46; here the signal is rectified, filtered, and amplified by about 2, to produce a signal of 10 v. The bias conditions determining the conduction of diode 88 are set by adjustment of potentiometer 86. Assume that the potentiometer is set for +10 v. The diode 88 will conduct and clamp point A of the circuit at +10v. A maximum voltage of +10v would then appear at the input of the inverter which would produce an output of −10v.

If the signal at 24, 26 were at .010 volts, the amplifier 38 would amplify this to 1 volt. After rectifying filtering and some gain (2), 2 volts would appear at the input to the inverter 68 so that −2 volts now appears at terminals 80, 82.

Figure 4:
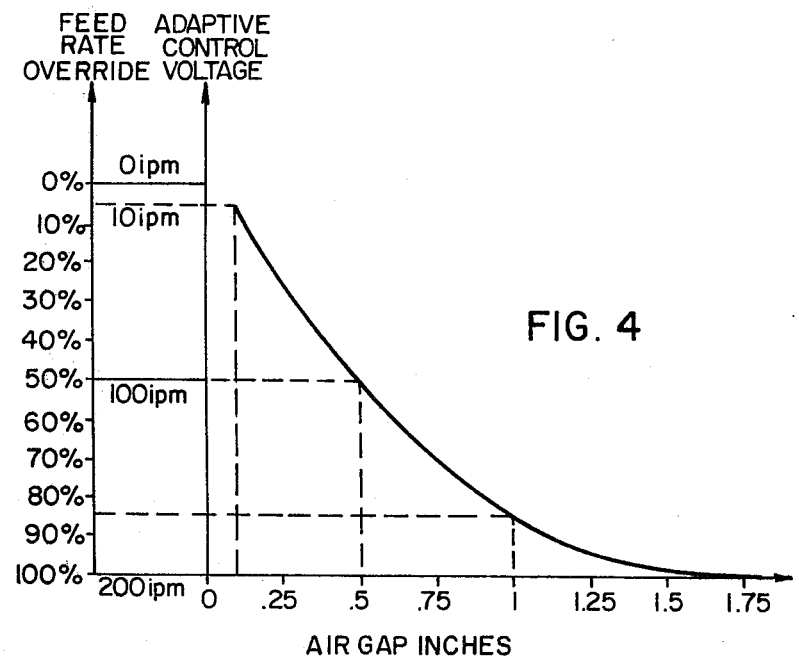

As shown in FIG. 4, the adaptive control voltage increases as the air gap decreases. This is a negative signal which is algebraically added to positive signal applied to the feed motor thus reducing the speed. As may be seen from a study of FIG. 4 the feed rate is gradually reduced from 200 inches per minute until at −10 volts the feed rate is proceeding at allowable impact feed when the cutter is some short displacement from the work piece.

The relationship of the adaptive control signal to the air gap is shown in FIG. 4. When the air gap is about 1.75 the feedrate is 200/inches/min; this rate drops to 85% at one inch, 50% at 0.5 inch and to 5% at 0.1 in. i.e. 10 inches/min. When machining low carbon steel the potentiometer 86 is set to produce an allowable impact feed of 10 inches/min.

The advantages of the instant invention are myriad. First of all the simplicity in installation insures low cost. The ferrous material flux path provides very reliable and reproducible results.

The utilization of the adaptive control technique is improved markedly. For example, without air gap sensing, speeds in air are of the order of 10–15 inches/min, maximum. With the use of the instant invention, rapid traverse feed rates in the order of 200 inches/min. are readily achievable.

As a cooperative technique, the adaptive control techniques enables the NC programmer to program only the path of the cutter leaving adaptive control to continuously monitor the feed rate and speed (especially in air).

The instant invention guards against cutting tool breakage resulting from programming errors. In view of the fact that the feed rate is automatically reduced as the work piece approaches the cutter, the machine operator can stop the machine tool in time to avoid work spoilage because of programming error not previously discernible. Finally, the inventive technique is applicable to a wide variety of machine tool utilizations such as lathes, milling machines and the like, and particularly to drilling operations which inherently form a closed magnetic circuit around the cutting tool.

We claim:

1. A control system for sensing the air gap between a cutting tool and a work piece mounted on a machine comprising:
   a. driving circuitry including drive coil means, having an inductance $L_1$, mounted on said machine, said driving circuitry being adapted to receive a source of electrical energy;
   b. search circuitry, including search coil means, having an inductance $L_2$, surrounding said cutting tool in proximity to said air gap, and mutually coupled $M_1$ to said drive coil means; and
   c. means for detecting the change in mutual inductance $\Delta M_1$ as a function of the instantaneous air gap displacement between the cutting tool and the work piece in accordance with:

$$\Delta M_1 = \Delta k \sqrt{L_1 L_2}$$

where $\Delta M_1$ = the instantaneous change in mutual inductance between the drive coil means and the search coil means
$\Delta k$ = the instantaneous change in coefficient of coupling
$L_1$ = the inductance of the drive coil means
$L_2$ = the inductance of the search coil means 2. A control system according to claim 1 including
   a. means, coupled to said detecting means, for deriving an adaptive voltage to control the traverse feed rate of said machine as a function of the displacement between the cutting tool and the workpiece.

3. A control system according to claim 2 wherein said adaptive voltage means comprises:
   means, connected to said detecting means for amplifying the output of the detecting means;
   means connected to said amplifying means for rectifying and filtering the amplified output to deliver a d.c. output; and,
   clamping means coupled to said rectifying-filtering means to limit the upper excursion of said d.c. output to a fixed potential.

4. A control system according to claim 3 including means for inverting the polarity of said d.c. output.

5. A control system for sensing the air gap between a cutting tool and a work piece mounted on a machine comprising:
   a. drive coil means mounted on said machine,
   b. search coil means, surrounding said cutting tool in proximity to said air gap, and mutually coupled $M_1$ to said drive means;
   c. mutual inductor means having first and second coils mutually coupled, having a variable mutual inductance $M_2$, the coils being connected in common at one end to a variable inductionless resistor $r$, said first coil being in series aiding relationship with said drive coil means, said second coil being in series opposition with said search coil means, the drive coil, first coil and said variable resistor being connected to an a.c. source, the induced voltage across the series combination of search coil means, second coil and inductionless resistor being initially nulled by adjusting $M_2$ and $r$ for a selected datum displacement between cutting tool and work piece, whereby the change in induced voltage $\Delta e$ across said series combination is a function of the instantaneous displacement between the cutting tool and the work piece.

6. A control system according to claim 5 including means coupled to receive said induced voltage $\Delta e$ for deriving an adaptive voltage to control the traverse feed rate of said machine as a function of the displacement between the cutting tool and the work piece.

7. A control system according to claim 6 wherein said adaptive voltage means comprises:
   means, connected to receive said induced voltage $\Delta e$ for providing an amplified a.c. voltage output;
   means connected to said amplified a.c. output for rectifying and filtering said a.c. output to deliver a d.c. output; and
   clamping means coupled to said rectifying-filtering means to limit the upper excursion of said d.c. output to a fixed potential.

8. A control system according to claim 7 including means for inverting the polarity of said d.c. output.

* * * * *